United States Patent
Masuyama et al.

(10) Patent No.: US 11,360,267 B2
(45) Date of Patent: Jun. 14, 2022

(54) WAVELENGTH DIVISION MULTIPLEXING COMMUNICATION SYSTEM AND ADJUSTMENT METHOD OF WAVELENGTH DIVISION MULTIPLEXING COMMUNICATION SYSTEM

(71) Applicant: Mitsubishi Electric Corporation, Tokyo (JP)

(72) Inventors: Kei Masuyama, Tokyo (JP); Mizuki Shirao, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/214,579

(22) Filed: Mar. 26, 2021

(65) Prior Publication Data
US 2021/0215880 A1 Jul. 15, 2021

Related U.S. Application Data

(63) Continuation of application No. PCT/JP2018/043158, filed on Nov. 22, 2018.

(51) Int. Cl.
*G02B 6/293* (2006.01)
*G02B 6/28* (2006.01)
(Continued)

(52) U.S. Cl.
CPC .......... *G02B 6/2938* (2013.01); *G02B 6/124* (2013.01); *G02B 6/12021* (2013.01); *G02B 6/2817* (2013.01)

(58) Field of Classification Search
CPC . G02B 6/2938; G02B 6/12021; G02B 6/2817
See application file for complete search history.

(56) References Cited

U.S. PATENT DOCUMENTS 9,054,493 B2* 6/2015 Krishnamoorthy .. H04B 10/506
2016/0336718 A1 11/2016 Takabayashi et al.
2017/0353001 A1* 12/2017 Takabayashi ......... H01S 5/1007

FOREIGN PATENT DOCUMENTS

JP 2016-213379 A 12/2016

* cited by examiner

*Primary Examiner* — Sung H Pak
(74) *Attorney, Agent, or Firm* — Birch, Stewart, Kolasch & Birch, LLP (57) ABSTRACT

Included are a transmitter and a receiver caused to have a constant temperature. The transmitter includes: a semiconductor optical amplifier having a reflection mirror at a first end thereof; an optical waveguide having a first end coupled to a second end of the semiconductor optical amplifier; a wavelength demultiplexing filter having an input port coupled to a second end of the optical waveguide and a plurality of output ports having constant transmission wavelength intervals; reflection structures to reflect part of light output from the output ports, the reflection structures provided for the respective output ports of the wavelength demultiplexing filter; modulators to modulate light transmitted through the reflection structures, the modulators provided for the respective reflection structures; and a wavelength multiplexing filter having input ports coupled to the respective output ends of the modulators, transmission wavelength intervals of the input ports being identical to the transmission wavelength intervals of the wavelength demultiplexing filter, and having the output port coupled to a first end of an optical fiber. The receiver includes: a wavelength demultiplexing filter having an input port coupled to a second end of the optical fiber and a plurality of output ports having the same transmission wavelength intervals as the transmission wavelength intervals of the wavelength demultiplexing filter and an FSR obtained by multiplying the transmission wavelength interval by the number of the (Continued)

output ports; light receivers to receive light output from the output ports, the light receivers provided for the respective output ports of the wavelength demultiplexing filter; and a temperature controller to control the temperature of the wavelength demultiplexing filter.

3 Claims, 4 Drawing Sheets

(51) Int. Cl.
*G02B 6/12* (2006.01)
*G02B 6/124* (2006.01)

WAVELENGTH DIVISION MULTIPLEXING COMMUNICATION SYSTEM AND ADJUSTMENT METHOD OF WAVELENGTH DIVISION MULTIPLEXING COMMUNICATION SYSTEM

CROSS REFERENCE TO RELATED APPLICATION

This application is a Continuation of PCT International Application No. PCT/JP2018/043158, filed on Nov. 22, 2018, which is hereby expressly incorporated by reference into the present application.

TECHNICAL FIELD

The present invention relates to a wavelength division multiplexing communication system having a multi-wavelength laser and an adjustment method of the wavelength division multiplexing communication system.

BACKGROUND ART

In optical communication systems, large-capacity optical transmission is performed using wavelength division multiplexing (WDM) technology. WDM technology is communication technology that bundles multiple rays of signal light of different wavelengths and sends the signals over a single optical fiber. In the current optical communication system, wavelength-variable lasers of which the number is identical to the number of communication wavelengths are arranged in parallel, and rays of signal light output from the respective wavelength-variable lasers are bundled by a wavelength multiplexer.

Meanwhile, multi-wavelength lasers that oscillate at multiple wavelengths simultaneously using an external resonator having a wavelength filter have been used in recent years. This multi-wavelength laser is expected to be applied to WDM (see, for example, Patent Literature 1).

CITATION LIST

Patent Literature

Patent Literature 1: JP 2016-213379 A

SUMMARY OF INVENTION

Technical Problem

In order to apply a multi-wavelength laser to WDM, all the oscillation wavelengths of the multi-wavelength laser need to be within a grid that is required in the WDM. In a multi-wavelength laser, oscillation wavelengths are defined by transmission wavelengths of a wavelength filter.

However, a transmission wavelength of a wavelength filter may deviate from the design value due to a manufacturing error of the multi-wavelength laser. For example, when an error occurs in the waveguide width of a multi-wavelength laser, the effective refractive index of the wavelength filter deviates from the design value, and the transmission wavelength of the wavelength filter deviates from the design value.

Thus, in order to cause a multi-wavelength laser to accurately oscillate at desired wavelengths, there is a problem that it is necessary to accurately control transmission wavelengths of a wavelength filter. Specifically, in the related art, for example, a heating element is arranged for the wavelength filter. The heating element to which a current is applied generates heat, and transmission wavelengths of the wavelength filter are controlled by controlling the refractive index of the wavelength filter by the thermo-optic effect.

The present invention has been made to solve the above problems, and it is an object of the present invention to provide a wavelength division multiplexing communication system that does not require control of the oscillation wavelengths of a multi-wavelength laser.

Solution to Problem

A wavelength division multiplexing communication system according to the present invention includes: a transmitter and a receiver caused to have a constant temperature, in which the transmitter includes: a semiconductor optical amplifier having a reflection mirror at a first end of the semiconductor optical amplifier; an optical waveguide having a first end coupled to a second end of the semiconductor optical amplifier; a first wavelength demultiplexing filter having an input port coupled to a second end of the optical waveguide and a plurality of output ports having constant transmission wavelength intervals; reflection structures to reflect part of light output from the output ports, the reflection structures provided for the respective output ports of the first wavelength demultiplexing filter; modulators to modulate light transmitted through the reflection structures, the modulators provided for the respective reflection structures; and a wavelength multiplexing filter having input ports coupled to output ends of the modulators, transmission wavelength intervals of the input ports being identical to the transmission wavelength intervals of the first wavelength demultiplexing filter, and having an output port coupled to a first end of an optical fiber, and the receiver includes: a second wavelength demultiplexing filter having an input port coupled to a second end of the optical fiber and a plurality of output ports having transmission wavelength intervals that are identical to the transmission wavelength intervals of the first wavelength demultiplexing filter, the second wavelength demultiplexing filter having a free spectral range obtained by multiplying the transmission wavelength interval by the number of the output ports; light receivers to receive light output from the output ports, the light receivers provided for the respective output ports of the second wavelength demultiplexing filter; and a temperature controller to control temperature of the second wavelength demultiplexing filter.

Advantageous Effects of Invention

According to the present invention, with the configuration as described above, it is not necessary to control the oscillation wavelengths of a multi-wavelength laser.

DESCRIPTION OF EMBODIMENTS

Hereinafter, embodiments of the invention will be described in detail with reference to the drawings.

First Embodiment

Figure 1:
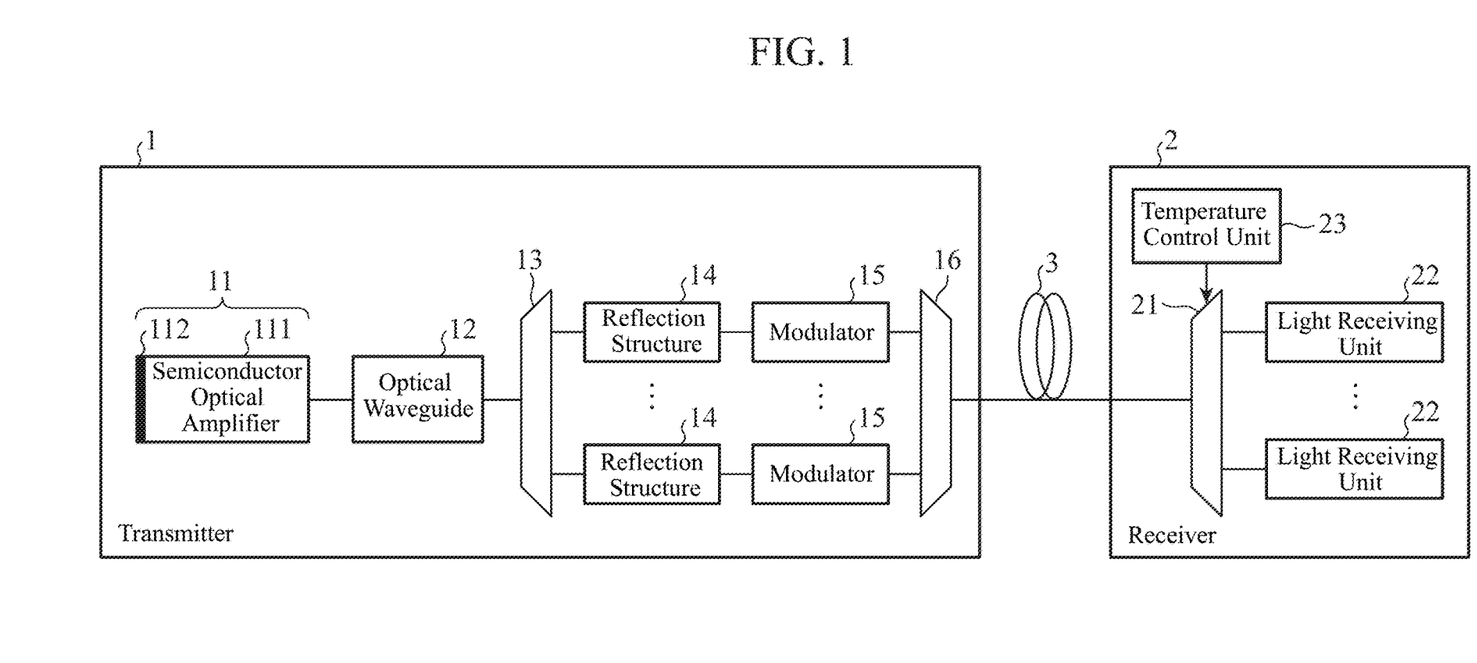
FIG. 1 is a diagram illustrating a configuration example of a wavelength division multiplexing communication system according to a first embodiment.

FIG. 1 is a diagram illustrating a configuration example of a wavelength division multiplexing communication (WDM) system according to a first embodiment.

As illustrated in FIG. 1, the WDM system includes a transmitter 1, a receiver 2, and an optical fiber 3 for connecting the transmitter 1 and the receiver 2.

As illustrated in FIG. 1, the transmitter 1 includes a gain waveguide 11, an optical waveguide 12, a wavelength demultiplexing filter (first wavelength demultiplexing filter) 13, a plurality of reflection structures 14, a plurality of modulators 15, and a wavelength multiplexing filter 16. The gain waveguide 11, the optical waveguide 12, the wavelength demultiplexing filter 13, and the plurality of reflection structures 14 constitute a multi-wavelength laser. Moreover, the transmitter 1 is controlled to have a constant temperature.

The gain waveguide 11 generates light when supplied with a current. The gain waveguide 11 corresponds to a semiconductor optical amplifier 111 having a reflection mirror 112 at a first end.

The optical waveguide 12 is a transmission path through which light is propagated and has a first end optically coupled to a second end of the semiconductor optical amplifier 111.

The wavelength demultiplexing filter 13 has a single input port and a plurality of output ports and outputs light input to the input port from each of the output ports for each wavelength. In the wavelength demultiplexing filter 13, the input port is coupled to a second end of the optical waveguide 12. Furthermore, in the wavelength demultiplexing filter 13, transmission wavelength intervals (transmission wavelength periods) of the output ports are constant. As the wavelength demultiplexing filter 13, for example, an arrayed waveguide grating (AWG) is used.

A reflection structure 14 is provided for each of the output ports of the wavelength demultiplexing filter 13 and is a mirror that reflects a part of the light that is output from the output port. Furthermore, light amplified to a predetermined level in the multi-wavelength laser is transmitted through the reflection structures 14. As a reflection structure 14, a cleavage end surface mirror of a semiconductor gain chip, a loop mirror, or a distributed Bragg reflector (DBR) is used.

The modulators 15 are external modulators provided to the respective reflection structures 14 and modulate the light transmitted through the reflection structures 14. As a modulator 15, for example, an electro-absorption modulator or a Mach-Zender type modulator is used.

The wavelength multiplexing filter 16 has a plurality of input ports and a single output port and bundles the rays of light that are input to the respective input ports and outputs light from the output port. In this wavelength multiplexing filter 16, the input ports are coupled to respective output ends of the modulators 15, and the output port is coupled to a first end of the optical fiber 3.

The wavelength multiplexing filter 16 has the same characteristics (including substantially the same) as those of the wavelength demultiplexing filter 13. That is, in the wavelength multiplexing filter 16, the transmission wavelength intervals of the input ports are the same (including substantially the same) as the transmission wavelength intervals of the wavelength demultiplexing filter 13, and the wavelength characteristic is the same (including substantially the same) as the wavelength characteristic of the wavelength demultiplexing filter 13.

In the following, it is assumed that the wavelength multiplexing filter 16 has completely the same characteristics as those of the wavelength demultiplexing filter 13. For example, in a case where an AWG is used as the wavelength demultiplexing filter 13, an AWG having exactly the same design as that AWG is used as the wavelength multiplexing filter 16. As a result, the wavelength demultiplexing filter 13 and the wavelength multiplexing filter 16 are affected by the same manufacturing error when the waveguide type integrated external resonator is configured, and thus the influence of a deviation from a design value is equal.

As illustrated in FIG. 1, the receiver 2 includes a wavelength demultiplexing filter (second wavelength demultiplexing filter) 21, a plurality of light receiving units 22, and a temperature control unit 23.

The wavelength demultiplexing filter 21 has a single input port and a plurality of output ports and outputs signal light, which has been input to the input port, from each of the output ports for each wavelength. The input port of the wavelength demultiplexing filter 21 is coupled to a second end of the optical fiber 3. Furthermore, the wavelength demultiplexing filter 21 has the same (including substantially the same) transmission wavelength intervals for the output ports as the transmission wavelength intervals of the wavelength demultiplexing filter 13 and also has a free spectral range (FSR) obtained by multiplying the transmission wavelength interval by the number of the output ports. As the wavelength demultiplexing filter 13, for example, an AWG is used.

Figure 2:
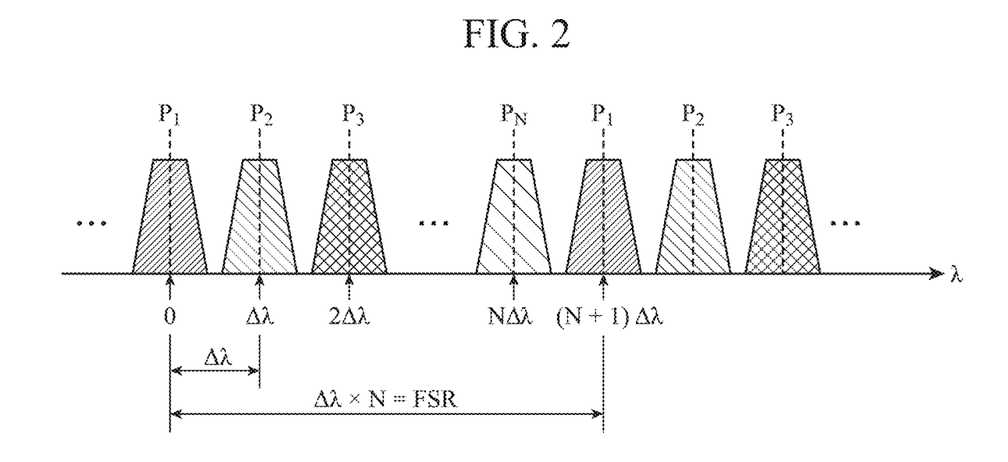
FIG. 2 is a diagram illustrating an example of output port conditions of a wavelength demultiplexing filter included in a receiver according to the first embodiment.

FIG. 2 is a diagram illustrating an example of output port conditions of the wavelength demultiplexing filter 21. In FIG. 2, a case is illustrated in which an AWG is used as the wavelength demultiplexing filter 21. In the following, it is assumed that the wavelength demultiplexing filter 21 has completely the same transmission wavelength intervals as the transmission wavelength intervals of the wavelength demultiplexing filter 13 and that the FSR completely matches the product of a transmission wavelength interval by the number of the output ports. In FIG. 2, a case is illustrated in which the number of output ports of the wavelength demultiplexing filter 21 is N, and $P_1$ to $P_N$ represent the port numbers of the respective output ports. In addition, in FIG. 2, $\lambda$ represents a wavelength, and $\Delta\lambda$ represents a transmission wavelength interval.

In FIG. 2, in the wavelength demultiplexing filter 21, the transmission wavelengths of the respective output ports are at regular intervals ($\Delta\lambda$). Furthermore, in the wavelength demultiplexing filter 21, the difference between the transmission wavelength at the Nth output port and the transmission wavelength at the (N+1)th output port at the next diffraction order is Δλ. That is, FSR=Δλ×N.

The light receiving units 22 are provided to the respective output ports of the wavelength demultiplexing filter 21 and receive light output from the output ports. As a light receiving unit 22, for example, a photo diode (PD) is used.

The temperature control unit 23 controls the temperature of the wavelength demultiplexing filter 21. As the temperature control unit 23, for example, a thermoelectric cooler (TEC) or a simple heater that applies an electric current to a heating element is used.

Next, an operation example of the WDM system illustrated in FIG. 1 will be described.

Since the transmitter 1 illustrated in FIG. 1 is controlled to have a constant temperature, the transmitter 1 is not affected by changes in the environmental temperature due to, for example, heat generated from an IC. Meanwhile, in the transmitter 1, the transmission wavelengths of the wavelength demultiplexing filter 13 deviate from the design value if a manufacturing error occurs in the multi-wavelength laser. In this case, the transmission wavelength interval of the wavelength demultiplexing filter 13 is constant.

In the transmitter 1 illustrated in FIG. 1, the oscillation wavelengths of the multi-wavelength laser are defined by the wavelength characteristics of the wavelength demultiplexing filter 13 and the wavelength characteristics of the plurality of reflection structures 14. Meanwhile, the transmitter 1 does not have a mechanism for controlling the oscillation wavelengths, for example, a mechanism utilizing thermo-optic effects. Therefore, the oscillation wavelengths are changed from the design value while maintaining the transmission wavelength intervals of the wavelength demultiplexing filter 13.

Then, rays of light emitted from the multi-wavelength laser are combined by the wavelength multiplexing filter 16 to become wavelength division multiplexing light. Then, this wavelength division multiplexing light reaches the receiver 2 through the optical fiber 3.

Here, in a case where the wavelength demultiplexing filter in the receiver 2 is a normal filter that can demultiplex only light having the wavelengths that match the grid of WDM, the oscillation wavelengths are changed from the design value, and thus the wavelength division multiplexing light cannot pass through the filter, which results in no communication performed.

Figure 3:
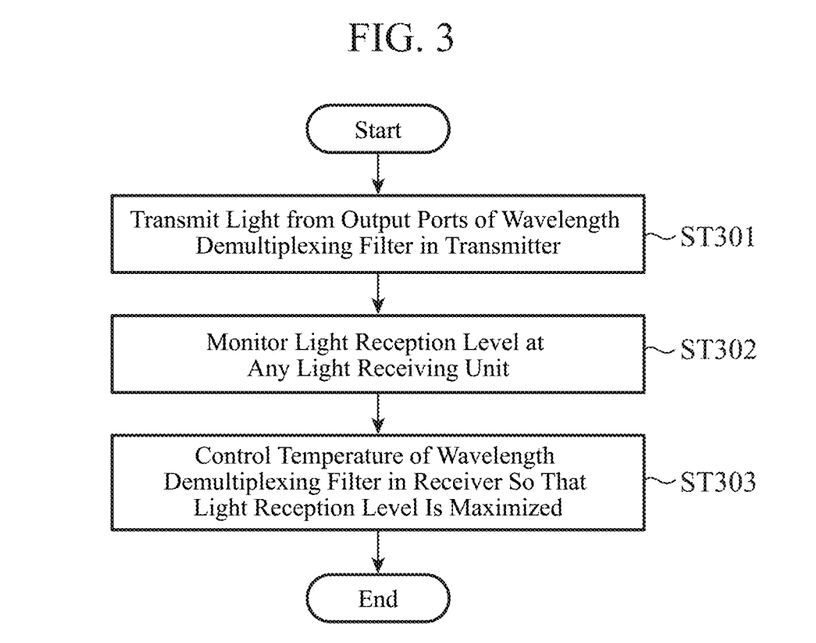
FIG. 3 is a flowchart illustrating an adjustment example of a wavelength demultiplexing filter included in the receiver according to the first embodiment.

On the other hand, in a case where the wavelength demultiplexing filter in the receiver 2 is the wavelength demultiplexing filter 21 having the characteristics as illustrated in FIG. 2, the wavelength division multiplexing light can pass through the wavelength demultiplexing filter 21 by adjusting the transmission wavelength of the wavelength demultiplexing filter 21 as illustrated in FIG. 3.

FIG. 3 is a flowchart illustrating exemplary adjustment of the wavelength demultiplexing filter 21. Note that it is assumed that the transmitter 1 and the receiver 2 are installed at actual use points and are coupled by the optical fiber 3.

In the exemplary adjustment of the wavelength demultiplexing filter 21, as illustrated in FIG. 3, an operator first transmits light from the output ports of the wavelength demultiplexing filter 13 (step ST301, transmission step).

The operator then monitors the light reception level at any one of the light receiving units 22 (step ST302, monitoring step).

Next, the operator controls the temperature of the wavelength demultiplexing filter 21 using the temperature control unit 23 so that the light reception level at the light receiving unit 22 that is being monitored is maximized (step ST303, temperature control step).

Here, in the first embodiment, the transmission wavelength intervals of the wavelength demultiplexing filter 13 and the transmission wavelength intervals of the wavelength multiplexing filter 16 in the transmitter 1 and the transmission wavelength intervals of the wavelength demultiplexing filter 21 in the receiver 2 completely match with each other.

Figure 4A:
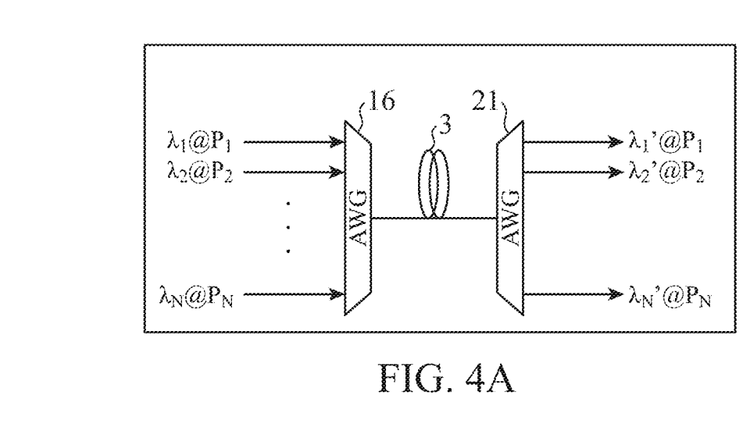
FIGS. 4A and 4B are diagrams illustrating an example of the correspondence between a wavelength demultiplexing filter included in a transmitter and the wavelength demultiplexing filter included in the receiver according to the first embodiment.

Therefore, when the adjustment at one of the output ports of the wavelength demultiplexing filter 21 is completed, adjustment at all the rest of the output ports is automatically completed, and communication between the transmitter 1 and the receiver 2 becomes possible (see FIG. 4A).

Note that the first output port of the wavelength demultiplexing filter 13 and the first output port of the wavelength demultiplexing filter 21 may not be adjusted so as to correspond to each other.

Figure 4B:
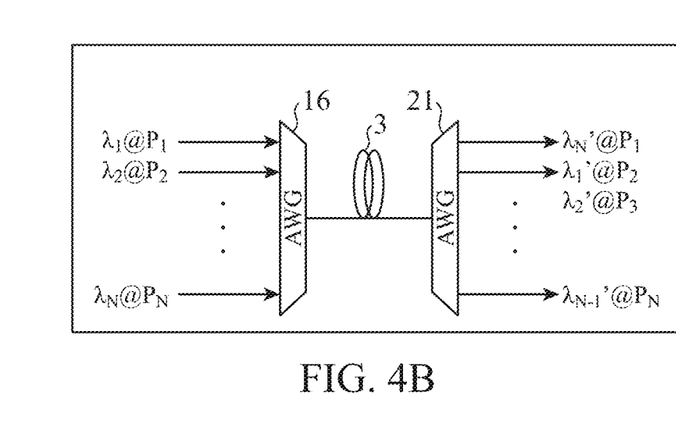

For example, adjustment may end in a state where the transmission wavelength (λi) at the i-th output port of the wavelength demultiplexing filter 13 and the transmission wavelength (λi') at the i-th output port of the wavelength demultiplexing filter 21 are changed by Δλ. In this case, as illustrated in FIG. 4B, light output from the first output port of the wavelength demultiplexing filter 13 is transmitted to the second output port of the wavelength demultiplexing filter 21, light output from the second output port of the wavelength demultiplexing filter 13 is transmitted to the third output port of the wavelength demultiplexing filter 21, and light output from the Nth output port of the wavelength demultiplexing filter 13 is transmitted to the first output port of the wavelength demultiplexing filter 21. The same applies even in a case where a difference between λi and λi' is m×Δλ.

As described above, in the wavelength division multiplexing communication system according to the first embodiment, deviation from the design value of oscillation wavelengths that is generated on the transmission side can be absorbed by simple temperature control on the reception side. Therefore, in the wavelength division multiplexing communication system according to the first embodiment, it can be expected to simplify the configuration of the multi-wavelength laser by omitting a precise wavelength control mechanism and to improve the productivity by allowing some difference in performance due to manufacturing variations. In addition, as the adjustment method of the transmission wavelength on the reception side, since wavelength filters having a periodicity are used in both the transmitter 1 and the receiver 2, adjustment of only one port allows all the ports to be adjusted simultaneously.

As described above, according to the first embodiment, the wavelength division multiplexing communication system includes the transmitter 1 and the receiver 2 controlled to have a constant temperature. The transmitter 1 includes: the semiconductor optical amplifier 111 having the reflection mirror 112 at a first end of the semiconductor optical amplifier 111; the optical waveguide 12 having the first end coupled to the second end of the semiconductor optical amplifier 111; the wavelength demultiplexing filter 13 having the input port coupled to the second end of the optical waveguide 12 and the plurality of output ports having constant transmission wavelength intervals; the reflection structures 14 for reflecting part of light output from the output ports, the reflection structures 14 provided for the respective output ports of the wavelength demultiplexing filter 13; the modulators 15 for modulating light transmitted through the reflection structures 14, the modulators 15 provided for the respective reflection structures 14; and the wavelength multiplexing filter 16 having input ports coupled to the respective output ends of the modulators 15, transmission wavelength intervals of the input ports being identical to the transmission wavelength intervals of the wavelength demultiplexing filter 13, and having the output port coupled to the first end of the optical fiber 3, and the receiver 2 includes: the wavelength demultiplexing filter 21 having an input port coupled to the second end of the optical fiber 3 and the plurality of output ports having the same transmission wavelength intervals as the transmission wavelength intervals of the wavelength demultiplexing filter 13 and an FSR obtained by multiplying the transmission wavelength interval by the number of the output ports; the light receiving units 22 for receiving light output from the output ports, the light receiving units 22 provided to the respective output ports of the wavelength demultiplexing filter 21; and the temperature control unit 23 for controlling the temperature of the wavelength demultiplexing filter 21. As a result, in the wavelength division multiplexing communication system according to the first embodiment, it is not necessary to control the oscillation wavelengths of a multi-wavelength laser.

Second Embodiment

In the first embodiment, the case has been described in which the transmission wavelength intervals of the wavelength demultiplexing filter 13 and the transmission wavelength intervals of the wavelength multiplexing filter 16 and the transmission wavelength intervals of the wavelength demultiplexing filter 21 are completely the same and the FSR of the wavelength demultiplexing filter 21 is exactly a product of the transmission wavelength interval by the number of the output ports. However, the above conditions may be lost due to, for example, a manufacturing error of the WDM system.

Figure 5:
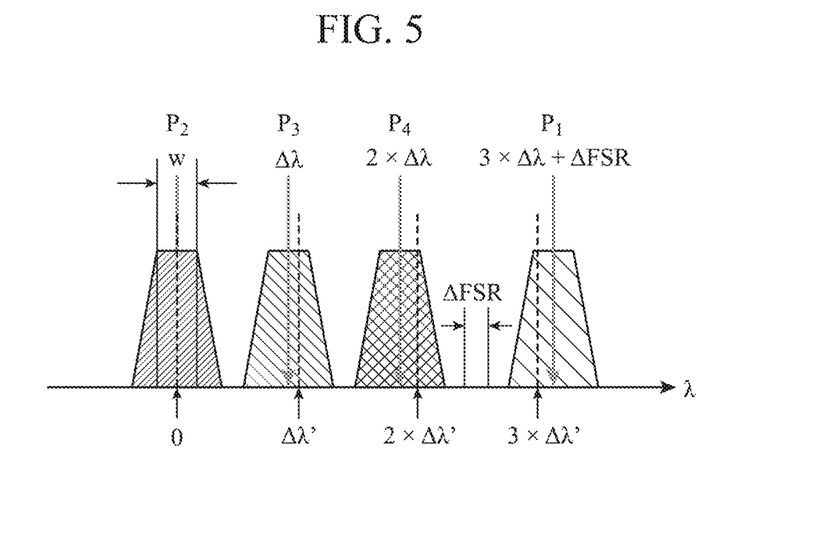
FIG. 5 is a diagram illustrating an example of output port conditions of a wavelength demultiplexing filter included in a receiver according to a second embodiment (where $\Delta\lambda'>\Delta\lambda$ and $\Delta FSR>0$).
Figure 6:
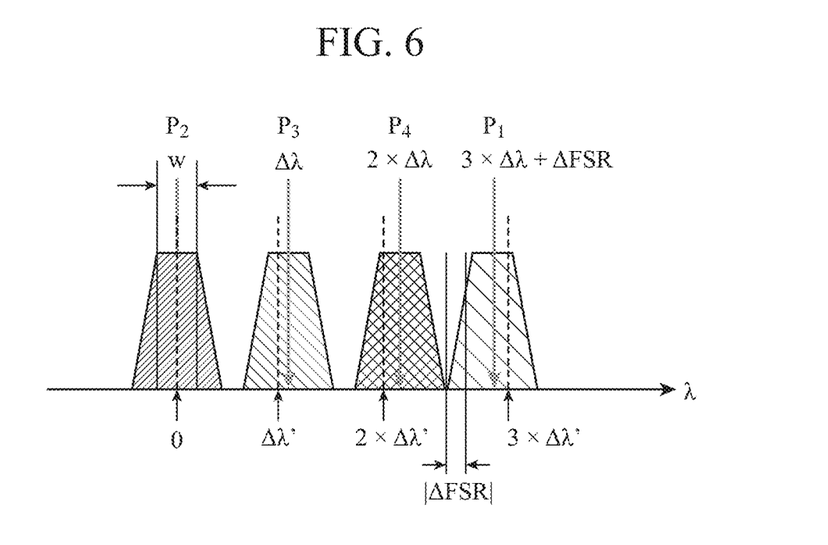
FIG. 6 is a diagram illustrating an example of output port conditions of a wavelength demultiplexing filter included in the receiver according to the second embodiment (where $\Delta\lambda'<\Delta\lambda$ and $\Delta FSR<0$).

FIGS. 5 and 6 are diagrams illustrating an example of output port conditions of the wavelength demultiplexing filter 21. In FIGS. 5 and 6, a case is illustrated in which an AWG is used as the wavelength demultiplexing filter 21. In FIGS. 5 and 6, the number of ports of the wavelength demultiplexing filter 21 is N=4. In FIGS. 5 and 6, $\Delta\lambda$ represents the design value of the transmission wavelength interval. Meanwhile, $\Delta\lambda'$ represents the actual value of the transmission wavelength interval. In addition, $\Delta FSR$ is a differential value between the actual value of the FSR and $N\times\Delta\lambda$. Moreover, w represents an allowable excess loss bandwidth at the output ports of the wavelength demultiplexing filter 21. The allowable excess loss bandwidth is the width of a band in which an allowable excess loss occurs at the output ports of the wavelength demultiplexing filter 21. Note that illustrated in FIG. 5 is a case where $\Delta\lambda'>\Delta\lambda$ and $\Delta FSR>0$ and that illustrated in FIG. 6 is a case where $\Delta\lambda'<\Delta\lambda$ and $\Delta FSR<0$.

In the case of FIG. 5, conditions for light transmitted from the transmitter 1 to enter the band of the wavelength demultiplexing filter 21 are as indicated by the following inequations (1) and (2). In inequations (1) and (2), i represents an integer.

$$\Delta\lambda \times i + (w/2) > \Delta\lambda' \times I \tag{1}$$

$$\Delta\lambda \times i + \Delta FSR - (w/2) < \Delta\lambda' \times I \tag{2}$$

Inequations (1) and (2) can be rearranged as the following inequations (3) and (4), respectively.

$$w > 2(\Delta\lambda' - \lambda\Delta)N \tag{3}$$

$$w > 2\{\Delta FSR - (\Delta\lambda' - \Delta\lambda)N\} \tag{4}$$

Meanwhile, in the case of FIG. 6, conditions for light transmitted from the transmitter 1 to enter the band of the wavelength demultiplexing filter 21 are as indicated by the following inequations (5) and (6).

$$\Delta\lambda \times i - (w/2) > \Delta\lambda' \times I \tag{5}$$

$$\Delta\lambda \times i + \Delta FSR + (w/2) < \Delta\lambda' \times I \tag{6}$$

Inequations (5) and (6) can be rearranged as the following inequations (7) and (8), respectively.

$$w < 2(\Delta\lambda' - \Delta\lambda)N \tag{7}$$

$$w < 2\{FSR - (\Delta\lambda' - \Delta\lambda)N\} \tag{8}$$

Therefore, the following inequations (9) and (10) are obtained from inequations (3), (4), (7), and (8).

That is, the wavelength demultiplexing filter 21 is only required to satisfy inequations (9) and (10) even when the transmission wavelength interval is not $\Delta\lambda$ or the FSR is not $N\times\Delta\lambda$. Note that the adjustment method of the wavelength demultiplexing filter 21 in this case is the same as the adjustment method described in the first embodiment.

$$w > 2|\Delta\lambda' - \Delta\lambda|N \tag{9}$$

$$w > 2\{|\Delta FSR| - |\Delta\lambda' - \Delta\lambda|N\} \tag{10}$$

As described above, the wavelength demultiplexing filter 21 does not need to have a transmission wavelength interval of $\Delta\lambda$ nor an FSR of $N\times\Delta\lambda$, and the productivity of the WDM system is not affected.

Note that the present invention may include a flexible combination of the embodiments, a modification of any component of the embodiments, or an omission of any component in the embodiments within the scope of the present invention.

INDUSTRIAL APPLICABILITY

The wavelength division multiplexing communication system according to the present invention does not require control of the oscillation wavelengths of a multi-wavelength laser and is suitable for use in, for example, a wavelength division multiplexing communication system having a multi-wavelength laser.

REFERENCE SIGNS LIST

1: transmitter, 2: receiver, 3: optical fiber, 11: gain waveguide, 12: optical waveguide, 13: wavelength demultiplexing filter (first wavelength demultiplexing filter), 14: reflection structure, 15: modulator, 16: wavelength multiplexing filter, 21: wavelength demultiplexing filter (second wavelength demultiplexing filter), 22: light receiving unit, 23: temperature control unit, 111: semiconductor optical amplifier, 112: reflection mirror

The invention claimed is:

1. A wavelength division multiplexing communication system comprising a transmitter and a receiver caused to have a constant temperature,
wherein the transmitter includes:
a semiconductor optical amplifier having a reflection mirror at a first end of the semiconductor optical amplifier;
an optical waveguide having a first end coupled to a second end of the semiconductor optical amplifier;
a first wavelength demultiplexing filter having an input port coupled to a second end of the optical waveguide and a plurality of output ports having constant transmission wavelength intervals;

reflection structures to reflect part of light output from the output ports, the reflection structures provided for the respective output ports of the first wavelength demultiplexing filter;

modulators to modulate light transmitted through the reflection structures, the modulators provided for the respective reflection structures; and a wavelength multiplexing filter having input ports coupled to output ends of the modulators, transmission wavelength intervals of the input ports being identical to the transmission wavelength intervals of the first wavelength demultiplexing filter, and having an output port coupled to a first end of an optical fiber, and the receiver includes:

a second wavelength demultiplexing filter having an input port coupled to a second end of the optical fiber and a plurality of output ports having transmission wavelength intervals that are identical to the transmission wavelength intervals of the first wavelength demultiplexing filter, the second wavelength demultiplexing filter having a free spectral range obtained by multiplying the transmission wavelength interval by the number of the output ports;

light receivers to receive light output from the output ports, the light receivers provided for the respective output ports of the second wavelength demultiplexing filter; and a temperature controller to control temperature of the second wavelength demultiplexing filter.

2. The wavelength division multiplexing communication system according to claim 1, wherein, in the second wavelength demultiplexing filter, following inequations are satisfied where w represents an allowable excess loss bandwidth at the output ports, $\Delta\lambda$ represents a design value of the transmission wavelength intervals, $\Delta\lambda'$ represents an actual value of the transmission wavelength intervals, N represents the number of the output ports, and $\Delta FSR$ represents a difference between an actual value of the free spectral range and a product of a design value of the transmission wavelength intervals by the number of the output ports:

$w > 2|\Delta\lambda' - \Delta\lambda|N$ $w > 2\{|\Delta FSR| - |\Delta\lambda' - \Delta\lambda|N\}$.

3. An adjustment method of a wavelength division multiplexing communication system including a transmitter and a receiver caused to have a constant temperature, the transmitter including: a semiconductor optical amplifier having a reflection mirror at a first end of the semiconductor optical amplifier; an optical waveguide having a first end coupled to a second end of the semiconductor optical amplifier; a first wavelength demultiplexing filter having an input port coupled to a second end of the optical waveguide and a plurality of output ports having constant transmission wavelength intervals; reflection structures to reflect part of light output from the output ports, the reflection structures provided for the respective output ports of the first wavelength demultiplexing filter; modulators to modulate light transmitted through the reflection structures, the modulators provided for the respective reflection structures; and a wavelength multiplexing filter having input ports coupled to output ends of the modulators, transmission wavelength intervals of the input ports being identical to the transmission wavelength intervals of the first wavelength demultiplexing filter, and having an output port coupled to a first end of an optical fiber, and the receiver including: a second wavelength demultiplexing filter having an input port coupled to a second end of the optical fiber and a plurality of output ports having transmission wavelength intervals that are identical to the transmission wavelength intervals of the first wavelength demultiplexing filter, the second wavelength demultiplexing filter having a free spectral range obtained by multiplying the transmission wavelength interval by the number of the output ports; light receivers to receive light output from the output ports, the light receivers provided for the respective output ports of the second wavelength demultiplexing filter; and a temperature controller to control temperature of the second wavelength demultiplexing filter, the adjustment method comprising:

transmitting light from the output ports of the first wavelength demultiplexing filter;

monitoring a light reception level with one of the light receivers; and controlling temperature of the second wavelength demultiplexing filter using the temperature controller so that the light reception level with the light receiver that is monitored in the monitoring step is maximized.

* * * * *